US009107184B2

(12) United States Patent
Yang et al.

(10) Patent No.: US 9,107,184 B2
(45) Date of Patent: Aug. 11, 2015

(54) METHOD FOR REDUCED-OVERHEAD SHORT MESSAGE TRANSMISSION

(75) Inventors: Yang Yang, Morris Plains, NJ (US); Xin Wang, Morris Plains, NJ (US); Jialin Zou, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 369 days.

(21) Appl. No.: 13/078,392

(22) Filed: Apr. 1, 2011

(65) Prior Publication Data

US 2012/0208545 A1 Aug. 16, 2012

Related U.S. Application Data

(60) Provisional application No. 61/442,520, filed on Feb. 14, 2011.

(51) Int. Cl.
*H04Q 7/10* (2006.01)
*H04W 74/00* (2009.01)
*H04W 74/08* (2009.01)

(52) U.S. Cl.
CPC ........ *H04W 74/002* (2013.01); *H04W 74/0833* (2013.01)

(58) Field of Classification Search
CPC .. H04W 74/0833; H04W 74/08; H04W 36/00
USPC ........... 455/450, 456; 370/328–338, 341–344
See application file for complete search history.

(56) References Cited

U.S. PATENT DOCUMENTS 8,289,911 B2 * 10/2012 Chun et al. .................... 370/329
2007/0165567 A1 * 7/2007 Tan et al. ...................... 370/329

(Continued)

FOREIGN PATENT DOCUMENTS

WO 2010/024550 A2 3/2010
WO PCT/US2012/023910 5/2012

OTHER PUBLICATIONS

Via Telecom: "Access Procedure Enhancements for MTC Applications", 3GPP Draft; R2-103968 Access Procedure Enhancement for MTC Applications, 3rd Generation Partnership Project (3GPP), Mobile Competence Centre; 650, Route Des Lucioles; F-06921 Sophia-Antipolis Cedex; France' vol. RAN WG2, no. Stockholm, Sweden; 20100628, Jun. 22, 2010, XP050451319, [retrieved on Jun. 22, 2010] *chapter 2, Enhanced Access Procedure for MTC*.
LG Electronics Inc: "Use of Broadcast Solutions for MTC", 3GPP Draft; R2-102125 MTC Broadcast R0, 3rd Generation Partnership Project (3GPP), Mobile Competence Centre; 650, Route Des Lucioles; F-06921 Sophia-Antipolis Cedex; France, vol. RAN WG2, no. Beijing, China; Apr. 12, 2010, Apr. 5, 2010, XP050422436, [retrieved on Apr. 5, 2010] paragraph [0065]—paragraph [0075] figure 5.

*Primary Examiner* — Ajit Patel
*Assistant Examiner* — Julio Perez
(74) *Attorney, Agent, or Firm* — C. Bilicska; J. Ligon

(57) ABSTRACT

For applications with very small data activities, connection of a UE to a wireless network for sending or receiving such small data traffic increments via conventional connection set-up processes is quite inefficient in terms of spectral resource utilization. The invention provides a new connectionless methodology for transmission of such small data increments between a UE and a serving eNB. In particular, the invention methodology contemplates identifying a set of preamble sequences among the pool of preamble sequences provided for access requests from a UE to an eNB via the Random Access Channel as corresponding to a request from the UE for access to transmit an increment of data smaller than a predetermined threshold data size. When a UE has data traffic to transmit of a size smaller than the predetermined threshold size, it selects one of the preamble sequences in the identified set and sends an access request, using the selected preamble sequence, to a serving eNB via the Random Access Channel. Upon receipt of the access request from the UE, the eNB determines an appropriate RF resource for the data increment sought to be transmitted by the UE, based on the use of the selected preamble sequence sent by the UE, and schedules an uplink connection for the transmission of that data increment by the UE.

14 Claims, 3 Drawing Sheets

(56) References Cited

U.S. PATENT DOCUMENTS

2009/0086698 A1* 4/2009 Roy et al. .................... 370/338
2010/0034141 A1* 2/2010 Meylan ........................ 370/328
2014/0064225 A1* 3/2014 Iwai et al. .................... 370/329

* cited by examiner

METHOD FOR REDUCED-OVERHEAD SHORT MESSAGE TRANSMISSION

RELATED APPLICATIONS

This application claims priority pursuant to 35 U.S.C. Sec 119(e) to U.S. Provisional Application No. 61/442,520, filed Feb. 14, 2011, entitled "METHOD FOR REDUCED-OVERHEAD SHORT MESSAGE TRANSMISSION," the subject matter thereof being fully incorporated herein by reference

FIELD OF THE INVENTION

The present invention generally relates to data transmission in a wireless communications system.

BACKGROUND OF THE INVENTION

In wireless communications systems applying Long Term Evolution (LTE) protocols and standards, the mobile unit, or User Equipment (UE) operates on one of two states relative to the radio interface maintained with a serving base station, or enhanced Node B (eNB). Those states are designated RRC_Connected and RRC_idle (RRC indicating "Radio Resource Control"). In the RRC_Connected state, the UE maintains an active connection with the eNB, while in the RRC_idle state, no connection exists between the UE and the eNB, with the UE waking up (turning on its receiver) at defined intervals to listen for pages from an eNB. As will be apparent, battery resources in the UE and RF resources in the cell in which the UE is operating will be much more heavily consumed in the RRC_Connected state than in the RRC_idle state (and, as well, intra-cell and inter-cell interference associated with the maintenance of an active connection between the UE and eNB will be largely absent in the RRC_idle state).

As implied in the prior paragraph, in the current LTE framework, a UE can only send user data to the wireless network (via its serving eNB) when the UE is in the RRC_Connected state. For a large data communication transaction, that is not an issue. However, for very small data transactions—e.g., a text message sent via the Short Message Service, setup for the connection encompasses substantial overhead in both connection maintenance and signaling, often consuming more system resources than that needed for the data transmission. This problem will certainly be exacerbated as the evolving field of Machine-to-Machine (M-to-M) communications via wireless connections continues to gain traction. With Machine-to Machine communications, the individual data transaction will in most cases be quite small, while the population of M-to-M transmitters is potentially very large—producing a load on the wireless system of a very large number of quite short data transactions.

Under the LTE standard, the eNB needs to either setup an RRC connection for each of the small transactions, and then tear-down the connection as soon as the data transaction is completed, or maintain a large number of idle RRC connections. Neither option permits an efficient utilization of wireless system resources.

To some degree, the signaling overhead associated with RRC connection is mitigated through operation of a procedure known as MAC-DRX, which allows the UE to periodically go to sleep if there is no traffic activity, while remaining in the connected state. However, while MAC-DRX effects a saving in UE battery consumption, it does not reduce eNB processing because eNB still needs to maintain the UE's RRC connection. In addition, this increases dramatically the handover activities because the UE is always in the RRC_Connected state, so mobility management effort is magnified.

With the increasing popularity of thin-traffic applications, the LTE infrastructure faces huge pressure to support a large number of RRC connections per cell in DRX mode, which becomes very challenging for the entire eNB population and the evolved packet core. Meanwhile user performance is less than optimal as well. For example, if the eNB needs to send data to a UE during the DRX OFF period, the eNB has to wait until UE comes out of DRX OFF and becomes active, which also incurs nontrivial delay.

SUMMARY OF INVENTION

As described above, for applications with very small data activities, connection of a UE to a wireless network for sending or receiving such small data traffic increments via conventional connection set-up processes is quite inefficient in terms of spectral resource utilization. The invention provides a new connectionless methodology for transmission of such small data increments between a UE and a serving eNB. In particular, the invention methodology contemplates identifying a set of preamble sequences among the pool of preamble sequences provided for access requests from a UE to an eNB via the Random Access Channel as corresponding to a request from the UE for access to transmit an increment of data smaller than a predetermined threshold data size. When a UE has data traffic to transmit of a size smaller than the predetermined threshold size, it selects one of the preamble sequences in the identified set and sends an access request, using the selected preamble sequence, to a serving eNB via the Random Access Channel. Upon receipt of the access request from the UE, the eNB determines an appropriate RF resource for the data increment sought to be transmitted by the UE, based on the use of the selected preamble sequence sent by the UE, and schedules an uplink connection for the transmission of that data increment by the UE.

In a further embodiment, the identified set of preamble sequences is sub-divided into multiple subgroups corresponding to particular RF conditions at the UE and sub-increments within the data increment less than the predetermined threshold. In yet a further embodiment, a method is provided for sending downlink data increments of a size less than the predetermined threshold through a corresponding simplified connection set-up process. And, related to the yet further embodiment, a paging procedure is provided for identifying an available downlink data increment of a size less than the predetermined threshold invention in the page sent to the UE to which the downlink data increment is addressed.

BRIEF DESCRIPTION OF THE FIGURES

The teachings of the present invention can be readily understood by considering the following detailed description in conjunction with the accompanying drawings, in which.

DETAILED DESCRIPTION

In the following description, for purposes of explanation and not limitation, specific details are set forth such as particular architectures, interfaces, techniques, etc., in order to provide a thorough understanding of illustrative embodiments of the invention. However, it will be apparent to those skilled in the art that the invention may be practiced in other illustrative embodiments that depart from these specific details. In some instances, detailed descriptions of well-known devices, circuits, and methods are omitted so as not to obscure the description of described embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

The invention is described hereafter in terms of an adaptation of random access channel preambles, or signatures, to achieve a connectionless transmittal for small data transaction, at a substantial savings in overhead and signaling resources relative to such transmission in the RRC_Connected state. While the disclosed invention is illustratively described in terms of a wireless system proving service according to the LTE standards, and the E-UTRAN air interface standard associated with such LTE wireless systems, it should be readily apparent that the inventive concept is applicable to other wireless configurations in which access to the wireless infrastructure from a mobile unit is initiated via a contention based, common transport channel having a plurality of defined access preambles.

Figure 1:
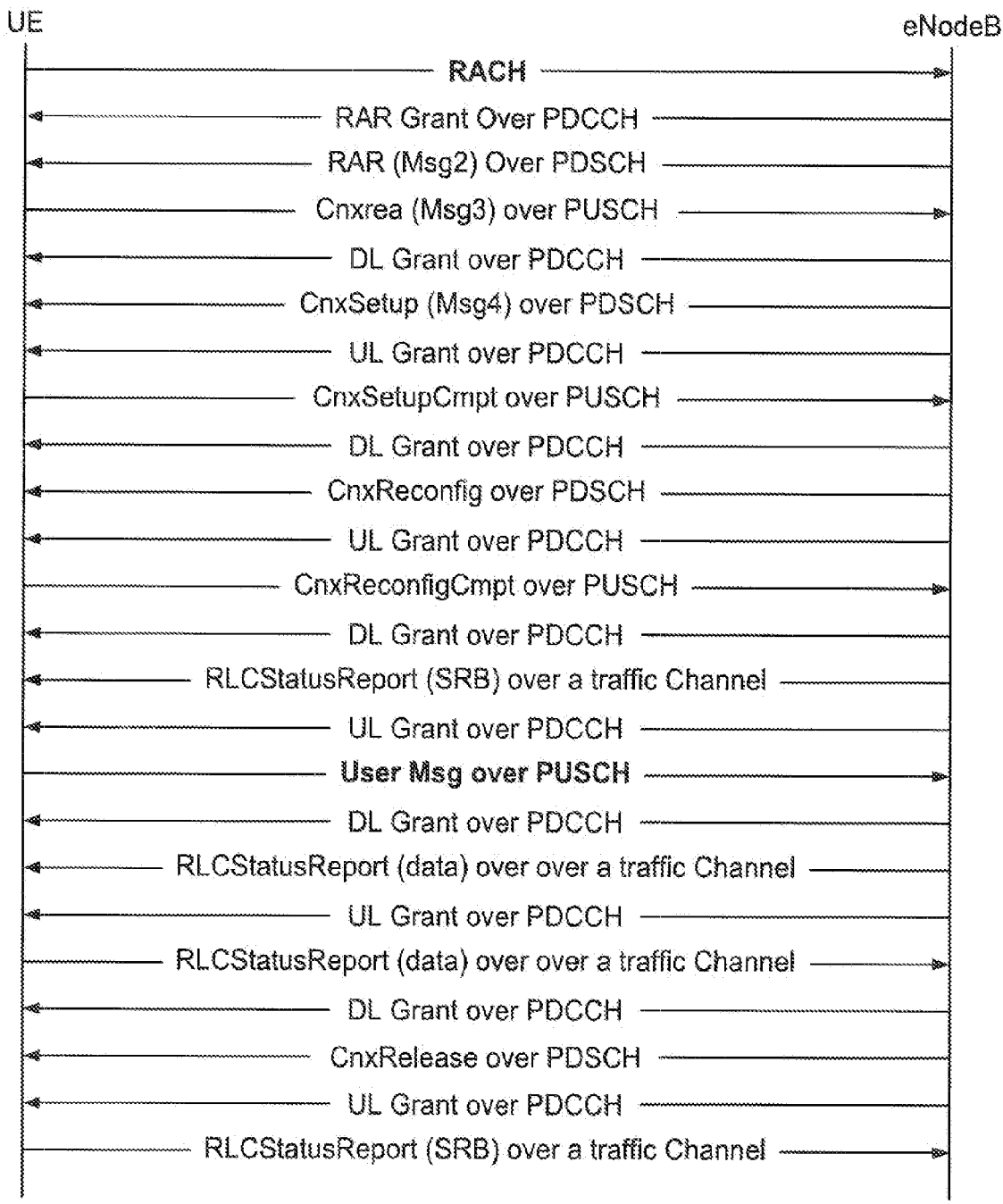
FIG. 1 provides a schematic depiction of a conventional message call flow for the set-up and take-down of a connection in a wireless system arrangement in which the method of the invention may be implemented.

In a wireless system implemented according to the LTE standards, a UE seeking to establish a connection with the network infrastructure, upon power-on or to move from RRC_Idle to RRC_Connected, does so through a series of messages exchanged with a serving eNB, and upon completing its data transmission, may effect a tear-down of that connection through another series of messages exchanged with the eNB. A representative such message exchange flow for a call set up and tear down is depicted in FIG. 1. As indicated in the figure, the connection process begins with a signaling message from the UE to the eNB via the LTE Random Access Channel (RACH) indicated the UE's desire to establish an active connection. The eNB responds with a Random Access Response (RAR) on the Physical Downlink Shared Channel (PDSCH) including an uplink (UL) resource grant and a temporary identifier for the UE.

The call flow then proceeds through a connection request (CnxReq) from the UE (Msg. 3) on the Physical Uplink Shared Channel (PUSCH), an initial connection setup message (CnxSetup) from the eNB (Msg. 4) on the PDSCH, a connection setup complete message (CnxSetupCmpt) from the UE on the PUSCH, followed by one ore multiple pairs of connection reconfiguration messages (CnxReconfig) from the eNB on the PDSCH and connection reconfiguration complete messages (CnxReconfigCmpt) from the UE on the PUSCH. Meanwhile most of these RRC messages, which run with RLC-Acknowledged mode, require an RLC Status Report (RLCStatusReport) on the traffic channel of the other direction. Finally, each of the above described signaling messages must be accompanied with resource grants issued from the eNB on the Physical Downlink Control Channel (PDCCH). After the complete setup of the RRC connection, the application data can start. Following completion of the UE's payload data (User Msg) transmission, the process continues with another series of messages and resource grants leading to the release of the connection by the eNB and confirmation of the release by the UE.

All of these connection setup and release steps are well known in the art, and need not be further described here. It should be readily apparent, however, from this brief description of the connection setup and release process that, while the signaling and overhead involved in the process may be acceptable in the case of the UE having a significant amount of data to transmit or receive, it represents a substantially inefficient consumption of system resources when applied in the context of very small data transactions.

It can thus be seen that for applications having very small data transaction activities, a substantially simplified interaction between the UE and the eNB would be very desirable. The inventors have developed such a simplified UE/eNB interaction, which they characterize as a connectionless data transmission, described hereafter, which achieves a substantial reduction in overhead and signaling load for small data transmissions.

The invention methodology provides a connectionless data transmission within the context of the LTE standards, and it is integrated with the existing connection-oriented data transmission framework specified in the standard. With both the connectionless data transmission of the invention and the RRC connection approach presently applied, the LTE network is able to provide both efficient and cost-effective data transmissions for diversified data applications. In general, the invention contemplates the establishment of a threshold data transmission size, which threshold may vary with local conditions, such that an offered data transaction smaller than the threshold size would be transmitted according to the invention methodology, with larger data transaction transmitted according to the conventional RRC connection methodology.

Returning briefly to the initial RACH request from the UE to the eNB as described above, in a cell serving hundreds of UEs (or more) it is likely that a number of UEs in a the cell will attempt to access the eNB via the RACH channel at a given time. To reduce the problem of RF collisions among those UE attempting near simultaneous access to the RACH, the LTE standards provide for multiple access preamble sequences (a.k.a. "signatures") to be used on the RACH—i.e., each UE accessing the RACH randomly selects one of the preamble sequences for sending its request to the eNB. (For the occasion of two UEs selecting the same preamble, the contention resolution process defined in the current standard applies.)

The only purpose of the preamble sequence transmitted by the UE in wireless systems of the art is to get the eNB's attention so as to initiate the signaling process such as establishing a connection between the network and the UE. The purpose of the signaling process only becomes clear after the RRC connection is set up. According to the method of the invention, certain RACH preamble sequences are adapted to directly indicate that the requested access is for a small data transaction where the RRC connection process is not needed, leading to a substantial truncation of the connection setup procedures.

In the current LTE standard, 64 preamble sequences are provided. A substantial portion of those 64 preamble sequences are allocated for "normal" contention access by the UEs, with the remaining portion allocated for non-contention access to address special cases such as contention-free handover. Because the allocation of preamble sequences between contention and non-contention access can vary from cell to cell, the eNB of each cell broadcasts the available preambles for contention and non-contention based access usage in that cell.

As noted above, the inventors have developed an adaptation of the RACH preamble sequences for providing additional information to the eNB than just an "alert" for the eNB. Specifically, the invention methodology provides for signaling to the eNB for requesting a small data transaction. To that end, the set of RACH preamble sequences for contention-based access usage are divided into two portions: (1) a first portion allocated for existing access purpose (i.e., the RACH "alert" function contemplated by the current LTE standard) and (2) a second portion allocated for identifying the "connectionless communication" needed for a small data transaction according to the method of the invention. The table below illustrates an exemplary such allocation of the total pool of RACH preamble sequences.

| NO OF ACCESS PREAMBLES (TOTAL = 64) | TYPE-0 (EXISTING) CONTENTION FREE | TYPE-1 (EXISTING) CONTENTION BASED | TYPE-2 (NEW) CONTENTION BASED |
|---|---|---|---|
| Total | 8 | 30 | 26 |

It should be understood that the specific numerical allocation of preamble sequences among the classifications shown in the table is exemplary and intended only to illustrate the principle of the invention. The specific allocation of such preamble sequences is expected to vary with different operating conditions characterizing the environment of a given cell (or perhaps a cluster of cells) and, as with the conventional approach, the preamble sequences available for a particular purpose in a given cell will be broadcast by the eNB for that cell. Additionally, it is anticipated that additional RACH sequences (than the present 64) may become available in the future, and the allocation suggested here would of course be adjusted based on such an increase in the number of available sequences. Finally, although the group of preamble sequences allocated for identifying a small data transaction is illustrated as being derived from the pool of contention-based sequences (representing the larger pool of such sequences in current practice), the principle of the invention would apply equally to an allocation of small-data-transaction sequences within the non-contention pool of such sequences.

While the classification described above provides a gross indicia to the eNB that the UE needs to initiate a small data transaction, that process is further optimized by the invention methodology. As will be explained further hereafter, in the invention method, the eNB allocates an uplink traffic grant to the UE for transmitting its small data transaction based on its receipt of a small-data-transaction sequence over the RACH. Optimally, however, in order to allocated the proper RF resources for the uplink transmission to be allocated to the UE (e.g., Physical Resource Blocks (PRBs) and modulation coding scheme (MCS)), the eNB needs additional information regarding the state of the RF channel associated with the UE (which is measured by the UE according to methods of the current art) and an approximation of the size of the small data transaction offered for transmission. Although a gross threshold respecting the size of the data transaction can be established to provide a dividing line between small data transactions to which the method of the invention would be applied and "large" data transactions that would be processed in the conventional way, there can still be granularity within the range of data sizes comprising a small data transaction that will impact optimum assignment of transmission resources for a given small data transaction.

To address this need, the invention methodology further classifies the pool of small-data-transaction preamble sequences (Type 2 in table above) into subsets of preamble sequences based on channel RF condition and data transaction size. Thus, the Type 2 preamble sequences are are grouped based on 2 criteria:

(a) The UE's RF condition, represented by an appropriate metric (such as Reference Signal Received Power (RSRP), Reference Signal Received Quality (RSRQ), DL Ec/Io etc);

(b) Data amount that needs to be transmitted/received.

For an illustrative embodiment of the invention, the inventors have made an allocation of the pool of Type 2 small-data-transaction preamble sequences among three RF-condition levels and three data size ranges, which illustrative allocation is shown in the table following. As will be seen in the table, the RF condition for a selected RF metric is divided among the three RF metric ranges of (1) less than a threshold value $R_0$; (2) between threshold value $R_0$ and threshold value $R_1$; and (3) above threshold value $R_1$. Similarly, for this exemplary case, the amount of data in the small data transaction sought to be transmitted (or received) is divided among three ranges of data size of (1) less than a threshold value $D_0$; (2) between threshold value $D_0$ and threshold value $D_1$; and (3) between threshold value $D_1$ and threshold value $D_2$, where threshold value D2 is the threshold value dividing small and "large" data transactions.

| CRITERIA (NOS. OF TYPE 2 SEQ) | RF_METRIC < THR_$R_0$ | RF_METRIC BETWEEN THR_$R_0$ AND THR_$R_1$ | RF_METRIC > THR_R1 |
|---|---|---|---|
| Response to CNXLESS Page | 1 | 1 | 1 |
| Data < THR_$D_0$ | 3 | 4 | 3 |
| Data Amount Between THR_$D_0$ and THR_$D_1$ | 2 | 3 | 2 |
| Data Amount Between (THR_$D_1$, THR_$D_2$) | 3 | 3 | 0 |

Two points should be made respecting the exemplary case represented by this table. First the particular numerical allocation of small-data-transaction preamble sequences shown in the various cells of the RF_Metric/Data_Size matrix represented by the table are chosen simply to illustrate the invention methodology, and any other allocation of the total available small-data-transaction preamble sequences among those cells is intended to be within the scope of the invention. Indeed, it is anticipated that the specific allocation of those sequences among the data size and RF condition categories will vary from cell to cell, depending on particular operating and environmental conditions characterizing a cell. Second, the illustrative choice of dividing the small-data-transaction preamble sequences among 3 RF condition ranges and 3 data size ranges is believed to be a useful level of granularity given the total number of such sequences available at the present time, but should not be construed to limit the scope of the invention in any way. Indeed the only real limitation on the granularity of either the RF condition parameter or the data size parameter is that the total number of available combinations cannot exceed the total number of available RACH preamble sequences. Similarly, the choice of the specific thresholds defining the RF-condition and data-size ranges is expected to vary among different system operators, and likely among cells as well, depending on specific conditions characterizing a cell or cell cluster, and all such variations are intended to be within the scope of the invention.

As will also be seen in the table, a specific sequence, per RF metric range, can also be allocated for sending a response to a page to the UE indicating a small data transaction available for sending to the UE from the network. As should be made clear from discussion hereafter of specific procedures to be applied in the case of a small data transmission from the network to the UE, the UE has no information at the time of receiving a page as to the size of the inbound small data transaction (the page message only indicating that the data size is in the small transaction class), but the eNB, which does (or will) know the transmission data size, needs information about the UEs RF condition for appropriately allocating downlink transmission resources for establishing a downlink connection to transmit the small data transaction to the UE.

As noted above, it is anticipated that an eNB will broadcast the allocation of RACH preamble sequences among non-contention, conventional contention, and small-data-transaction contention sequences to UEs operating within its cell. An adaptation of one or more System Information Block (SIB) messages broadcast by the eNB may be used to convey the additional information needed for identifying an appropriate preamble sequence for a given small data transaction for which the UE will seek a connectionless transmission channel. Alternatively, the inventors believe that a preferred course, which is made part of the invention methodology, is to establish new SIB for broadcast by the eNB which would include the following information:
1. the threshold values defining the RF condition ranges for the cell;
2. the data-size threshold values defining the data-size ranges applicable in the cell; and
3. the specific allocation of access preamble sequences that a UE can use for each (RF condition, data amount) bin.

Hereafter, specific procedures are described for supporting a connectionless transmission of a small data transaction according to the method of the invention in the uplink direction (from UE to eNB) and in the downlink direction (from the network, via the eNB, to the UE). In each case, the UE is assumed to be initially in the RRC_Idle state.

Figure 2:
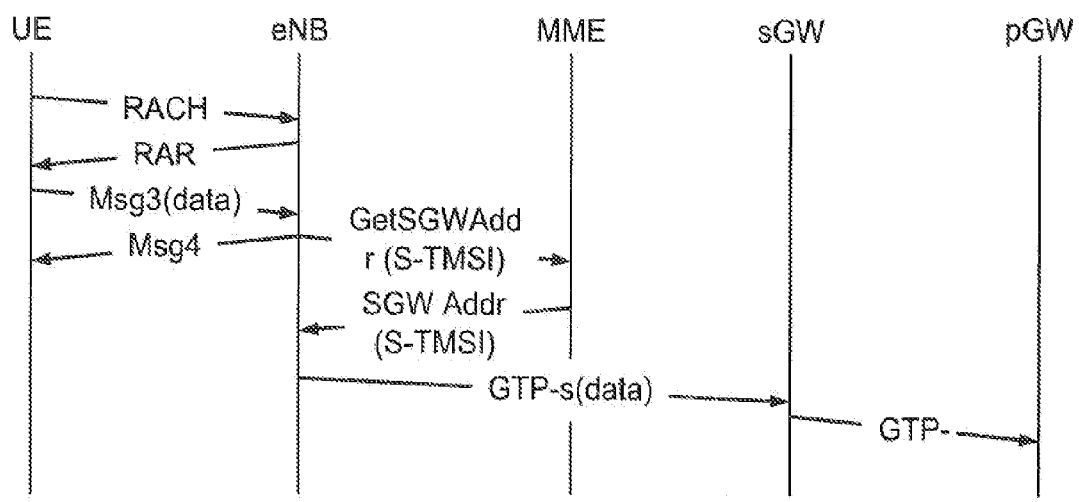
FIG. 2 provides a timing diagram for UE-originated data transmission in connectionless mode according to the method of the invention.

For the UE-initiated uplink case, the message flow among the UE, the eNB and other network elements is schematically illustrated in FIG. 2. In this case, the UE initially selects, from the RACH-preamble-sequence SIB broadcast by the eNB, one of the preamble sequences in the RF_condition/data_size bin appropriate to the RF condition experienced at the UE and the size of the data transaction the UE wishes to transmit, and, as shown in the figure, sends the selected sequence to the eNB via the RACH. Once the eNB detects the sequence, it has most of the information needed to allocate the RF resources on the uplink traffic channel needed to transmit the small data transaction. This corresponding essentially to the first step (as illustrated in FIG. 1) of the conventional uplink connection set-up process, At this point, the following steps are carried out:

The eNB determines the appropriate MCS and PRB allocation for the UE based on the RACH preamble sequence received.

The eNB sends a Random Access Response (RAR) including assigned MCS and UL PRB resource allocation to the UE.

The UE responds by sending up the data encapsulated in the Msg3. That is, the Msg3 payload is no longer the regular RRC signaling message; instead, it contains application IP packet. The IP source address is used by the network to uniquely identify the UE. UE also includes the UE contention resolution identity in the message.

When the eNB receives Msg. 3 from the UE, it sends Msg. 4 to acknowledge that reception, including the UE's contention resolution identity.

When the UE receives acknowledgement Msg. 4 from the eNB, it notifies the upper protocol layer from which the small-data transaction was initiated that the transmission is successful. The UE then returns to the Idle state.

If the UE fails to receive acknowledgement Msg. 4 from the eNB by the timeout of a configurable timer, the UE notifies the upper layer of the apparent transmission failure, so the upper layer may re-initiate another round of access process if needed.

Meanwhile, after the eNB gets the encapsulated application data, as well as the UE identity, it forwards the small-data transaction to the S-GW through a shared GTP channel. It also communicates with the Mobility Management Entity (MME) for the identified UE to retrieve the communication channel information that allows the Serving Gateway (S-GW) to deliver the data to the correct PDN gateway via an appropriate GTP tunnel. The detailed protocol design between eNB, S-GW and MME that enables the data forwarding to Internet via EPS is outside of the scope of this invention.

Before describing the process for sending a network originated small-data transaction to the UE via a downlink connection from the eNB to the UE, a change in the paging process should be described that is needed to alert the UE that data traffic queued in the network for transmission to the UE is of the small-data nature. The current standard page record has a field CN-Domain which can be set to either PS (indicating Packet Switching) or CS (indicating a fall back to Circuit Switching). The invention methodology adds a new field conditioned on the "PS" setting of the CN-Domain field—specifically a PS-Type: cnx or cnxless. This new field value notifies the UE of the nature of the communication—i.e., either a conventional data transmission using a normal RF connection set-up (designated "Cnx") or a small-data transmission using a connectionless RF transmission path (designated "cnxless") according to the invention methodology, so that UE is able to select the appropriate RACH resource to respond the page.

Figure 3:
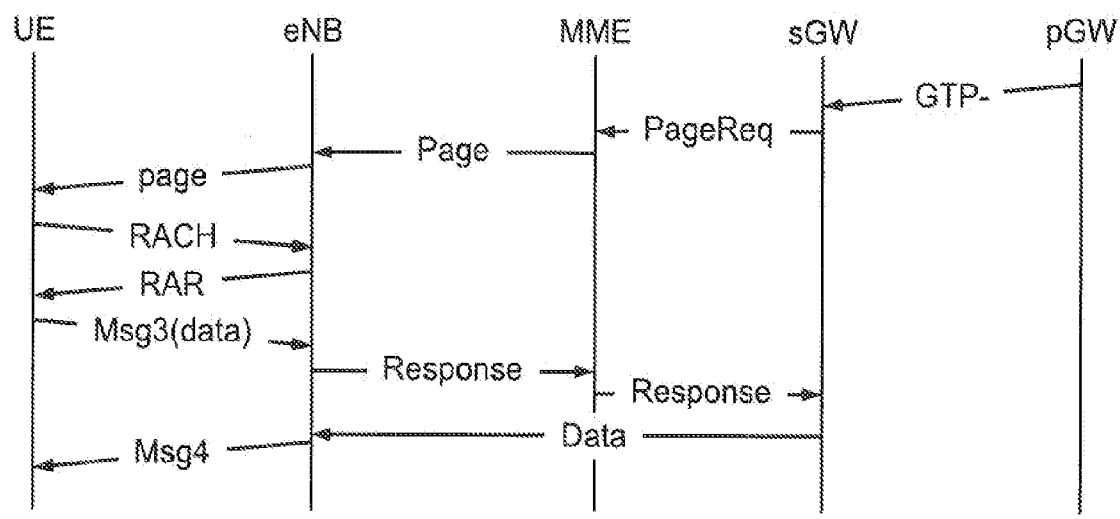
FIG. 3 provides a timing diagram for UE-terminated data transmission in connectionless mode according to the method of the invention.

For the downlink small-data transaction case, the message flow among the S-GW, MME, eNB and UE is schematically illustrated in FIG. 3. Upon receipt of the small data transaction at the S-GW for a given user in RRC_IDLE, the MME sends a paging notification to the appropriate eNB, or group of eNBs, for paging the addressed UE including the data size when the user is eligible for connectionless RF transmission. Note that the absence of an indication of data size in the paging notification (default case) is construed to mean the page is for a conventional connection oriented transmission of the data, thus maintaining backward compatibility of the paging process with legacy UE equipment that has not been configured to operate with the connectionless process.

Upon the sending of the paging notification from the MME to the eNB, the following steps are carried out:

When the eNB receives a paging notification for a connectionless eligible page request, it determines whether a connectionless page should be sent in its cell based on the local threshold and the data backlog size. If the page qualifies, the eNB sends the page message with the PS-Type set to "cnxless".

If the paged UE resides in the eNB coverage and it receives such a page, it responds via RACH with an appropriately selected connectionless access preamble based on its observed RF condition (the preamble selection as explained above).

When eNB receives the UE's RACH page response, it sends a Random Access Response (RAR) including to a request for the UE's identification and the timing offset for synchronization of the UE.

The UE then responds by sending up Msg. 3 with the requested UE identification (ID).

If the ID matches the eNB paging UE ID, the eNB notifies the MME to stop the page process. It also retrieves the IP packet data from S-GW via a shared GTP tunnel and sends it to the UE in Msg. 4.

If the eNB receives HARQ ACK from the UE, it assumes the message is delivered successfully to UE.

If the eNB receives HARQ NAK from the UE after the maximum number of HARQ transmissions, it notifies S-GW that the transmission has failed, so S-GW can re-initiate another round of page process if needed.

Relatedly, as a result of page response from the UE, the MME is able to update the location information associated with the UE to assist the future potential pages to the UE.

In a further embodiment of the invention, a backhaul is provided from the Radio Access Network (RAN) to the Evolved Packet Core (EPC) for the data sent via the connectionless RF process. In that embodiment, each eNB opens a shared data tunnel with each S-GW in the Tracking Area Code (TAC) with which the eNB is in communication for all connectionless data transmissions with that S-GW. The tunnel runs the same GTP protocol, but the address is a special value reserved for connectionless transmissions. The eNB selects the GTP tunnel based on the S-GW that the UE is connected with. Once the data is received by the S-GW, the user IP packet is retrieved and the source IP address is used to determine the UE ID and the corresponding Packet Data Network Gateway (P-GW, and the packet is sent over a corresponding connectionless eligible EPS bearer between the S-GW and the P-GW for that UE.

In yet a further embodiment of the invention, a method is provided for enabling the EPC/IMS to identify data traffic arriving at the EPC/IMS for downlink transmission to an addressed UE as being a small data transaction eligible for connectionless RF transmission. With that method, a new field will be added into the Traffic Flow Template (TFT) to allow an operator to configure an EPS bearer of a user that is eligible for connectionless data transmissions. At most one EPS bearer can be configured as connectionless eligible per IP address. Such an EPS bearer must be configured as "stay open after UE as long as UE is attached". An obvious example of such an EPS bearer is the default EPS bearer of the user. The enhanced TFT (as described above) is made available to the P-GW and the S-GW via existing standard interfaces. When the S-GW receives downlink data for a UE determined to be in the idle state, it determines whether the downlink data is to be sent over the connectionless eligible bearer based on the TFT. It then notifies the MME for sending a paging request together with the bearer type (cnxless or cnx) and the data amount (if bearer type=cnxless). The MME relays that information to eNB if the page is for a connectionless eligible bearer.

Herein, the inventors have disclosed a system and method for more efficient utilization of RF resources in connections between a UE and an eNB for transmission of small data transactions. Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. A method in a wireless communication system comprising:

identifying a set of access preamble sequences used for transmitting a request in a wireless access channel as corresponding to a request for access to transmit an increment of data smaller than a predetermined threshold data size;

causing a mobile station having data to transmit of a size smaller than the predetermined threshold size to select one of the access preamble sequences in the identified set for sending an access request, for transmission of said data, to a serving access node via an access channel; and causing the serving access node to allocate a transmission resource for connectionless transmission of said data based on the selected access preamble sequence sent from the mobile station;

wherein the identified access preamble sequences are subdivided into multiple sub-groups corresponding to defined granularity in transmission characteristics of the data offered for transmission by the mobile station;

wherein access preamble sequences in one of the subgroups correspond to particular RF conditions existent at the mobile station offering the data for transmission; and wherein a subset of the RF conditions access preamble sequences is established to provide feedback from the mobile station to an access node of the wireless system in respect to RF conditions existent at the mobile station in respect to a paging message from the access node to the mobile station.

2. The method of claim 1 further comprising:

sending a message from the serving access node to the mobile station identifying the allocated transmission resource and authorizing transmission using that resource by the mobile station; and transmission of the data by the mobile station using the allocated transmission resource.

3. The method of claim 1 wherein the RF conditions access preamble sequences are divided among a discrete number of bands based on increasing or decreasing values of an RF condition parameter.

4. The method of claim 1 wherein access preamble sequences in one of the sub-groups correspond to particular sub-increments of the data offered for transmission.

5. The method of claim 4 wherein the particular sub-increments are divided among a discrete number of bands over a range from a smallest transmission increment to the predetermined threshold data size.

6. The method of claim 1 wherein the identified access preamble sequences are provided as a subset of a set of access preamble sequences defined for initial access for a mobile station to an access node of the wireless communication system under standards established for Long Term Evolution wireless systems.

7. The method of claim 1 wherein the identified set of access preamble sequences are broadcast by an access node in the wireless system to mobile stations in geographic proximity of the access node.

8. The method of claim 7 wherein the broadcast of the identified access preamble sequence is implemented via a dedicated System Information Block (SIB).

9. The method of claim 8 wherein the dedicated SIB comprises:
threshold values defining RF condition ranges for the access node serving area;
data-size threshold values defining data-size ranges applicable in the serving area; and
specific allocation of access preamble sequences that a mobile station can use for each RF condition and data amount bin.

10. The method of claim 1 wherein a shared tunnel is provided between a given access node and a Serving Gateway (S-GW) for all data traffic from the given access node to the S-GW of a data size smaller than the predetermined threshold data size.

11. A method in a wireless communication system comprising:
identifying a set of indicia used for transmitting a request in a wireless access channel as corresponding to a request for access to transmit an increment of data smaller than a predetermined threshold data size;
providing within the identified indicia set a sub-group corresponding to particular RF conditions existent at a given mobile station;
receiving a paging notification by an access node in the wireless system for a mobile station served by the access node; wherein the paging notification indicates that a message of a data size smaller than the predetermined threshold data size is available for transmission to a mobile station identified in the paging notification;
sending a paging message from the access node to the identified mobile terminal, the paging message indicating that a message of a data size smaller than the predetermined threshold data size is available for transmission to the mobile station;
receiving a paging response from the mobile station including one of the identified set of indicia selected to indicate an RF condition at the mobile terminal; and
allocating a transmission resource for transmission of a data message identified in the paging message based on a size of the data message and the RF condition reported by the mobile station.

12. The method of claim 11 further comprising transmission of the data message from the access node to the mobile station using the allocated transmission resource; and
acknowledgment by the mobile station of receipt of the transmitted data message.

13. The method of claim 11 wherein indication in the paging notification that a message of a data size smaller than the predetermined threshold data size is available for transmission to an identified mobile station is implemented by a value in a defined field of a page record defined for paging notification.

14. The method of claim 11 wherein a shared tunnel is provided between a given access node and a Serving Gateway (S-GW) for all data traffic from the S-GW to the given access node of a data size smaller than the predetermined threshold data size.

* * * * *